United States Patent [19]

Yamamoto et al.

[11] Patent Number: 4,992,336

[45] Date of Patent: Feb. 12, 1991

[54] MAGNETO-OPTICAL RECORDING MEDIUM

[75] Inventors: Ryoichi Yamamoto; Takashi Yamada, both of Kanagawa, Japan

[73] Assignee: Fuji Photo Film Co., Ltd., Kanagawa, Japan

[21] Appl. No.: 369,622

[22] Filed: Jun. 21, 1989

[30] Foreign Application Priority Data

Jun. 27, 1988 [JP] Japan ................. 63-158366

[51] Int. Cl.⁵ .................. G11B 7/24; G11B 11/14
[52] U.S. Cl. .................... 428/635; 428/668; 428/678; 428/928; 369/288
[58] Field of Search ............ 428/635, 615, 660, 661, 428/668, 678, 679, 681, 680, 928; 365/122; 369/13, 288

[56] References Cited

U.S. PATENT DOCUMENTS

| | | | |
|---|---|---|---|
| 4,293,621 | 10/1981 | Togami | 428/928 |
| 4,489,139 | 12/1984 | Ohta et al. | 428/928 |
| 4,576,699 | 3/1986 | Sato et al. | 428/678 |
| 4,670,356 | 6/1987 | Sato et al. | 428/928 |
| 4,717,628 | 1/1988 | Takahashi et al. | 428/928 |
| 4,727,005 | 2/1988 | Sato | 428/678 |
| 4,789,606 | 12/1988 | Yamada et al. | 428/928 |
| 4,837,118 | 6/1989 | Yamamoto et al. | 428/668 |

FOREIGN PATENT DOCUMENTS 63-140076  6/1988  Japan ................. 204/192.2

Primary Examiner—John J. Zimmerman
Attorney, Agent, or Firm—Sixbey, Friedman, Leedom & Ferguson

[57] ABSTRACT

A magneto-optical recording medium is disclosed, comprising a substrate having thereon a recording layer comprising laminated thin films of rare earth metals and transition metals, wherein said recording layer has a structure such that a unit of laminated thin films is periodically laminated in the thickness direction of the recording layer, and each unit of said laminated thin films is composed of at least four thin films and includes a thin film of a rare earth metal having disposed adjacent to both surfaces of the thin film of the rare earth metal a thin film of a transition metal as the upper and lower layers.

6 Claims, No Drawings

MAGNETO-OPTICAL RECORDING MEDIUM

FIELD OF THE INVENTION

This invention relates to a magneto-optical recording medium and, in particular, to a magneto-optical recording medium having improved magnetic recording characteristic achieved by improving the recording layer.

BACKGROUND OF THE INVENTION

Recently, a magneto-optical recording medium has been widely utilized for applications such as a large capacity data file, in the form of a magneto-optical disk capable of writing and reading using laser light.

The magneto-optical recording medium has layers of a multilayer structure composed of an enhancing layer, a recording layer, a protective layer, an adhesive layer, etc., each having a thickness of from several tens angstroms (Å) to several tens micrometers (μm) formed on a transparent base plate such as, for example, a glass sheet, a plastic film, or the like, by a sputtering and other methods.

To produce a magneto-optical effect in the aforesaid recording layer, a single layer of an alloy of a rare earth metal and a transition metal or alternately laminated two or more layers of a thin film of the rare earth metal and a thin film of the transition metal each having a thickness of from several angstroms (Å) to ten and several angstroms (Å) are used. In particular, the latter type recording layer composed of the alternately laminated thin films of the rare earth metal and the transition metal produces excellent magnetization amount, coercive force and magneto-optical effect (Kerr effect) and has the advantage of easily controlled characteristics. Magneto-optical recording media having such a recording layer are disclosed in JP-A-61-108112, JP-A-59-217247, JP-A-62-26659, JP-A-62-71041, and JP-A-62-137753 (the term "JP-A" as used herein refers to a "published unexamined Japanese patent application").

In particular, a magneto-optical recording medium having a recording layer composed of alternately laminated thin films of terbium (Tb) and an Fe-Co alloy shows the most excellent characteristics. However, Tb is an expensive material, which makes the widespread use of this material in a magneto-optical recording medium difficult. Thus, a magneto-optical recording medium wherein a part of Tb is replaced with inexpensive dysprosium (Dy) or gadolinium (Gd) to form a recording layer composed of the alternately laminated thin films of a Tb-Dy alloy and an Fe-Co alloy is proposed as disclosed in U.S. Pat. No. 4,727,005, JP-A-59-217249, etc. However, in the magneto-optical recording medium, a Kerr rotation angle ($\theta_k$) does not become large and thereby the recording medium having a high C/N ratio is difficultly obtained. Also, in the case of using Gd as a part of Tb for a recording layer, the Kerr rotation angle ($\theta_k$) may be increased but Hc becomes low and hence a magneto-optical medium having a high C/N ratio is not obtained.

SUMMARY OF THE INVENTION

This invention has been made for overcoming the aforesaid problem in conventional techniques and the object of this invention is to provide a magneto-optical recording medium which is excellent in characteristics such as the C/N ratio and the like, and is also inexpensive.

It has now been discovered that the aforesaid object can be attained by the present invention as set forth hereinbelow.

That is, according to this invention, there is provided a magneto-optical recording medium comprising a substrate having thereon a recording layer comprising the laminated thin films of rare earth metals and transition metals, wherein the recording layer has a laminate structure in which a unit of laminated thin films in the thickness direction of the recording layer is periodically laminated and each unit of the laminated films is composed of at least four thin films and preferably includes a thin film of Dy having adjacent to both surfaces thereof a thin film of Co as the upper and lower layers.

DETAILED DESCRIPTION OF THE INVENTION

In this invention, preferably the reduction of the Kerr rotation angle ($\theta_k$) can be restrained by forming a thin film of Co adjacent to both surfaces of a thin film of Dy, which results in enabling the provision of a magneto-optical recording medium having a relatively large Kerr rotation angle ($\theta_k$) and an excellent C/N ratio by using Dy. This is thought to be based on reducing the chance of bonding of Fe and Dy, which is considered to be the cause of reducing the Kerr rotation angle ($\theta_k$) by forming the thin film of Co adjacent to the thin film of Dy.

The aforesaid unit of laminated films of the recording layer in this invention includes at least one thin film of a rare earth metal and/or at least one thin film of a transition metal in addition to the three laminated thin films of Co/Dy/Co in this order. As the thin film of the transition metal, the thin film of a metal such as Fe, Co, Ni, and the like is preferred, and as the thin film of the rare earth metal, the thin film of a metal such as Tb, Gd, Nd, Sm, and the like is preferred. Among these metals, Fe and Tb are particularly preferred. When these metals are used, a magneto-optical recording medium having excellent characteristics can be obtained, and particularly when at least one of the transition metals in Fe and at least one of the rare earth metal is Tb, excellent characteristics can be preferably obtained.

The number of thin films included in the unit of laminated films according to the present invention is preferably from 4 to 6.

Furthermore, by adding thin films of Tb and Fe laminated in the order of Fe/Tb/Fe to the aforesaid unit of laminated thin films, e.g., by employing a structure of six laminated thin films of Fe/Tb/Fe/Co/Dy/Co in this order as the unit of laminated thin films for the recording layer, the coercive force and the squareness ratio can be further increased, and a magneto-optical recording medium having excellent recording and reproducing characteristics and bit stability can be obtained.

Moreover, when the composition ratio of each rare earth metal and transition metal in the aforesaid recording layer is shown by $(Tb_{1-x}Dy_x)_a(Fe_{1-y}Co_y)_{1-a'}$ a, x, and y are preferably as follows:

$0.15 \leq a \leq 0.30$ $0.25 \leq x \leq 1.90$ $0.05 \leq y \leq 0.30,$ and particularly preferably $0.18 \leq a \leq 0.25$ $0.40 \leq x \leq 0.80$ $0.10 \leq y \leq 0.30.$ If a is larger than 0.30 or smaller than 0.15, a perpendicularly magnetized film is not obtained. Also, if x exceeds 0.90, Hc is reduced and a magneto-optical recording medium having a high C/N ratio is not obtained. On the other hand, if x is less than 0.25, the magneto-optical recording medium becomes too costly. Also, if y is less than 0.05, the Kerr rotation angle ($\theta_k$) is reduced and a magneto-optical recording medium having a high C/N ratio is not obtained, while if y is larger than 0.30, the Curie temperature (Tc) becomes too high and the sensitivity is reduced.

The magneto-optical recording medium of this invention may comprise a recording layer having a plurality of units of laminated thin films.

The thickness of each thin film of a metal constituting the aforesaid unit of laminated thin films can be usually from 3 Å to 30 Å and preferably from 10 Å to 25 Å. Also, it is preferred that the thickness of the unit of laminated thin films is 60 Å or less. If the thickness of the unit of laminated thin films exceeds 60 Å, a recording layer having a perpendicular magnetic anisotropy is not formed.

The total thickness of magneto-optical recording medium of the present invention comprising a recording layer having the unit of laminated thin films is preferably from 100 to 2,000 Å and more preferably from 200 to 1,500 Å.

The thickness of the unit of laminated thin films can be determined from the length of one period of the pattern obtained by analyzing the unit by an X-ray low angle scattering method.

The recording layer of this invention can be formed on the substrate by arranging the targets of the metals to be laminated in the formation of the unit of laminated thin films in the order in which they are laminated and then sputtering the metals onto the substrate. In the most general method, a recording layer having repeatedly or periodically laminated units of laminated thin film is formed on the substrate by rotating a disk-form holder having fixed thereon the substrate so that the substrate is passed over the targets of metals arranged in the order of the thin films to be laminated for one unit while simultaneously sputtering the metals onto the substrate.

The recording layer may be directly formed on the substrate or it may be formed after forming an enhancing layer or a protective layer of a nitride such as silicon nitride, aluminum nitride; an oxide such as silicon oxide; a sulfide; or a mixture thereof. Furthermore, a protective layer of a nitride such as silicon nitride, aluminum nitride; an oxide such as silicon oxide; a sulfide, a mixture thereof, or a polymer may be formed on the recording layer after it has been formed on the substrate.

For the substrate, polycarbonate, polymethyl methacrylate, an epoxy resin, various olefinic resins, glass, and the like can be used.

The present invention is further described in detail by the following examples.

EXAMPLE 1

On an injection-molded polycarbonate disk plate having a thickness of 1.2 mm and a diameter of 130 mm as a substrate were successively formed an enhancing layer, a recording layer, and a protective layer as described below by a sputtering apparatus equipped with 5 cathodes of 8 inches for magnetron sputtering to provide a magneto-optical recording medium.

The aforesaid substrate was set on a holder in the sputtering apparatus, after evacuating the sputtering apparatus until the pressure in the sputtering chamber was lowered $5 \times 10^{-7}$ Torr or less, an argon gas was introduced into the chamber up to 5 milli Torr (i.e., $5 \times 10^{-3}$ Torr), and a radio frequency (RF) electric power of 1.5 kw was applied to the target for silicon nitride to form an SiN layer of 800 Å in thickness as the enhancing layer. Thereafter, a DC electric power of 400 w was applied to each of the targets for Tb, Fe, Co, and Dy to form the recording layer. In this case, the shutter opening time for each target was controlled so that the component ratio of the metal atoms of the recording layer was within the composition formula $(Tb_{1-x}Dy_x)_a(Fe_{1-y}Co_y)_{1-a'}$ and $x=0.5$, $y=0.15$, and $a=0.22$. Also, the order of opening the shutters for the targets and opening times of the shutters were controlled so that the thin films of the metals for each unit of laminated films were laminated on the enhancing layer in the order of Fe/Tb/Fe/Co/Dy/Co and the thickness of each unit of laminated thin films became 40 Å to form a recording layer having a total thickness of 1,000 Å.

Furthermore, an SiN thin layer of 1,000 Å in thickness was formed on the recording layer as a protective layer under the same conditions as the above enhancing layer was formed.

EXAMPLE 2

By following the same procedure as in Example 1 except that the shutter opening time for each target was controlled so that the component ratio of the metal atoms became in the composition formula, $x=0.8$, $y=0.15$, and $a=0.22$, a magneto-optical recording medium was prepared.

COMPARATIVE EXAMPLE 1

By following the same procedure as in Example 1 using two kinds of targets, $Tb_{50}Dy_{50}$ and $Fe_{85}Co_{15}$, as the targets for the recording layer, a recording layer having double layer laminated films of the thin film of a TbDy alloy and the thin film of an FeCo alloy as the unit of the laminated thin films was formed on the enhancing layer. In this case, the shutter opening time for each target was controlled so that the atomic compositions of the thin films became $Tb_{50}Dy_{50}$ and $Fe_{85}Co_{15}$.

Other conditions were the same conditions as those in Example 1 to prepare a magneto-optical recording medium.

COMPARATIVE EXAMPLE 2

By following the same procedure as in Example 1 except that the target for Co was omitted, a recording layer having the laminated thin layers of Fe/Tb/Fe/Dy in that order as the unit of laminated thin films was formed on the enhancing layer.

Other conditions were the same conditions as those in Example 1 to prepare a magneto-optical recording medium.

On each of the magneto-optical recording media prepared in the aforesaid examples and comparative examples, the Kerr rotation angle ($\theta_k$) and the C/N ratio were measured by the following methods.

Kerr Rotation Angle ($\theta_k$)

Kerr Hysteresis Loop Measurement Apparatus Applied Magnetic Field: 15 KOe.

C/N Ratio

The magneto-optical recording medium was rotated at 1,800 rpm by a drive using pin differential fluctuation detection pick-up and then the C/N ratio was measured by applying a laser light pulse at a single period of carrier 3.7 MHz.

The results obtained are shown in Table 1.

TABLE 1

| Sample | Kerr Rotation Angle ($2 \times \theta_k$) (degree) | C/N (dB) |
| --- | --- | --- |
| Example 1 | 1.38 | 46.8 |
| Example 2 | 1.17 | 45.4 |
| Comparative Example 1 | 1.08 | 44.3 |
| Comparative Example 2 | 0.68 | 40.5 |

From the results shown above, it can be seen that in the magneto-optical recording media of this invention produced according to Example 1 and Example 2 wherein each has a unit of laminated thin films constructed so that the thin film of Co is disposed adjacent to the thin film of Dy and the thin film of Fe is disposed adjacent to the thin film of Tb, the Kerr rotation angle and the C/N ratio were larger and higher than those of the magneto-optical recording medium produced according to Comparative Example 1 in which the unit laminated thin films are composed of a thin film of a TbDy alloy and a thin film of an FeCo alloy. Thus, the magneto-optical recording media according to this invention could obtain excellent characteristics even if Dy which was inexpensive as compared with Tb was used.

Also, the magneto-optical recording medium in Comparative Example 2, which has the unit laminated thin films constructed so that a thin film of Fe is disposed adjacent to the thin film of Dy, showed considerably reduced characteristics such as the Kerr rotation angle and the C/N ratio.

While the invention has been described in detail and with reference to specific embodiments thereof, it will be apparent to one skilled in the art that various changes and modifications can be made therein without departing from the spirit and scope thereof.

What is claimed is:

1. A magneto-optical recording medium comprising a substrate having thereon a recording layer comprising laminated thin films of rare earth metals and transition metals, wherein said recording layer has a structure such that a unit of laminated thin films is periodically laminated in the thickness direction of the recording layer, and each unit of said laminated thin films is composed of at least four thin films and includes a thin film of a first rare earth metal having disposed adjacent to both surfaces of the thin film of the first rare earth metal, a thin film of a first transition metal as the upper and lower layers, wherein the unit of laminated thin films includes the thin film of Dy having disposed adjacent to both surfaces thereof the thin film of Co as the upper and lower layers and, alternatively, a thin film of a second different rare earth metal or a thin film of a second different transition metal adjacent to at least one of said upper and lower first transition metal layers.

2. The magneto-optical recording medium as in claim 1, wherein the unit of laminated thin films includes at least one thin film of Tb having disposed adjacent to both surfaces thereof the thin film of Fe as the upper and lower layers.

3. The magneto-optical recording medium as in claim 1, wherein the unit of laminated thin films is the laminate of the films of rare earth metals, Tb and Dy and the films of transition metals, Fe and Co laminated in the order of Fe/Tb/Fe/Co/Dy/Co.

4. The magneto-optical recording medium as in claim 1, wherein the unit of said laminated thin films is composed of the four thin films comprising Co, Dy and Tb laminated in the order of Co/Dy/Co/Tb.

5. The magneto-optical recording medium as in claim 1, wherein said first and second rare earth metals are selected from the group consisting of Dy, Tb, Gd, Nd and Sm, and said first and second transition metals are selected from the group consisting of Fe, Co and Ni.

6. The magneto-optical recording medium as in claim 1, wherein the upper layer is formed from a transition metal different from the transition metal forming said lower layer.

* * * * *